(12) United States Patent
Rodriguez

(10) Patent No.: US 10,654,434 B2
(45) Date of Patent: May 19, 2020

(54) UNIVERSAL BUMPER PLOW

(71) Applicant: Raven N. Rodriguez, Houston, TX (US)

(72) Inventor: Raven N. Rodriguez, Houston, TX (US)

( * ) Notice: Subject to any disclaimer, the term of this patent is extended or adjusted under 35 U.S.C. 154(b) by 0 days.

(21) Appl. No.: 16/111,205

(22) Filed: Aug. 23, 2018

(65) Prior Publication Data

US 2018/0361969 A1    Dec. 20, 2018

Related U.S. Application Data

(63) Continuation-in-part of application No. 15/199,998, filed on Jul. 1, 2016, now abandoned.

(51) Int. Cl.
| | |
|---|---|
| *E01H 5/06* | (2006.01) |
| *B60R 19/48* | (2006.01) |
| *B60R 19/02* | (2006.01) |
| *B60R 19/38* | (2006.01) |

(52) U.S. Cl.
CPC ............ *B60R 19/48* (2013.01); *B60R 19/023* (2013.01); *B60R 19/38* (2013.01); *E01H 5/061* (2013.01); *E01H 5/066* (2013.01)

(58) Field of Classification Search
CPC ..... A01C 17/00; B60R 16/0237; B60R 19/48; B60R 19/38; B60R 19/023; B60T 8/00; B60T 8/172; E01C 19/004; E01C 19/21; E01H 5/06; E01H 5/066; E01H 5/061; E01H 5/065; E01H 5/068
USPC ................. 37/197, 231, 232, 236, 268, 279; 172/817; 239/1, 61, 663, 665, 675
See application file for complete search history.

(56) References Cited

U.S. PATENT DOCUMENTS

| | | | | |
|---|---|---|---|---|
| 2,936,537 | A * | 5/1960 | Bain | E01H 5/076 37/202 |
| 3,456,368 | A * | 7/1969 | Jacques | E01H 1/108 126/343.5 R |
| 3,793,752 | A * | 2/1974 | Snyder | E01H 5/063 37/234 |
| 4,271,617 | A * | 6/1981 | Yoshizawa | E01H 1/101 239/754 |
| 4,907,357 | A | 3/1990 | Lilienthal | |
| 5,046,271 | A * | 9/1991 | Daniels | E01H 5/068 37/231 |
| 5,058,295 | A * | 10/1991 | Holland | E01H 5/068 172/445.1 |
| 5,265,356 | A | 11/1993 | Winter | |
| 5,485,690 | A | 1/1996 | MacQueen | |
| 5,515,623 | A * | 5/1996 | Weeks | E01H 5/066 239/159 |
| 6,116,846 | A | 9/2000 | Bulkley | |
| 6,163,985 | A | 12/2000 | Chinnery et al. | |
| 6,173,904 | B1 * | 1/2001 | Doherty | A01C 17/00 239/1 |
| 6,453,582 | B1 | 9/2002 | Fulton, III | |
| 6,516,544 | B1 * | 2/2003 | Matisz | E01H 5/06 37/231 |
| 8,528,237 | B1 | 9/2013 | Bacall | |

* cited by examiner

*Primary Examiner* — Robert E Pezzuto
(74) *Attorney, Agent, or Firm* — Raven n Rodriguez

(57) ABSTRACT

A custom bumper for plowing snow is hingeably mounted to a frame of a vehicle that can be lowered to the surface of the road for plowing snow, then retracted back to its original position as a vehicle bumper, by the vehicle operator utilizing hydraulics controlled from inside the vehicle.

5 Claims, 4 Drawing Sheets

UNIVERSAL BUMPER PLOW

CROSS-REFERENCE TO RELATED APPLICATION(S)

The present application is a Continuation-in-Part application related to and claims priority to Pending U.S. Non-Provisional patent application Ser. No. 15/199,998 filed Jul. 1, 2016, which is incorporated by reference herein in its entirety.

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of snow plow devices and more specifically relates to snow plow systems entitled, "Raven Bumper Plow".

2. Description of Related Art

Many different types of snowplows are known to the art. Most such snowplows that are intended for common use with passenger vehicles tend to be heavy and cumbersome and difficult for the average person to couple and de-couple alone. Because of their size and bulk, they are not generally stored in the common residential garage but are usually stored outdoors in the weather where they take up considerable space, get in the way, and detract from the appearance of a residential neighborhood and deteriorate from unnecessary exposure to the weather. Most such snowplows are operated by means of specially designed vehicle engine or electric powered hydraulic systems which are also heavy. These custom designed engines or hydraulic systems add to the difficulty of initial fit-up of the vehicle mounting frame to the vehicle and add significantly to the expense of such plows. Such plows usually have a single piece straight mold board structurally strong and heavy enough to withstand the pushing and pulling of the hydraulic pistons while pivoting about the mid-point where the mold board is connected to the plow frame.

Some plow mold boards are hinged in the center in order to provide various useful plowing configurations. These also are of necessity of heavy and complex construction that does not lend itself to easy and quick assembly and dis-assembly and storage. Because such hinged mold boards are usually hinged at (in the plane of) the mold boards themselves, the normal concave curve of the mold boards must be altered adding significantly to the weight, cost of construction and reducing mold board operational efficiency. This is not desirable.

Several attempts have been made to solve the above-mentioned problems such as those found in U.S. Pat. No. 4,907,357 to Scott; U.S. Pat. No. 5,265,356 to Kent; U.S. Pat. No. 5,485,690 to James; U.S. Pat. No. 6,116,846 to Neil; U.S. Pat. No. 6,163,985 to Chinnery et al.; U.S. Pat. No. 6,453,582 to Richard; and U.S. Pat. No. 8,528,237 to Paul. This art is representative of snow plow devices. However, none of the above inventions and patents, taken either singly or in combination, is seen to describe the invention as claimed.

BRIEF SUMMARY OF THE INVENTION

In view of the foregoing disadvantages inherent in the known snow plow device art, the present invention provides a novel snow plow system, a custom made bumper of a vehicle that works as a snow plow device. The general purpose of the present invention, which will be described subsequently in greater detail is to provide a snow plowing means that is easy and covenant to use.

A custom made bumper of a vehicle that works as a snow plow device is disclosed herein, in a preferred embodiment, comprising: a snow plow system for a vehicle, comprising: a snow plow assembly including a plurality of hydraulic jacks; a plurality of mounts; a plurality of spray nozzles; a fluid container; and a three-way valve; wherein the snow plow assembly comprises in functional combination the plurality of hydraulic jacks, the plurality of mounts, the spray nozzles; fluid container, and the three-way valve.

The plurality of hydraulic jacks are mounted to the plurality of mounts which are controlled via the three-way valve. The fluid container is in fluid communication with the plurality of spray nozzles such that the fluid is able to be sprayed on and about the snow plow assembly. Wherein the snow plow assembly comprises a front bumper of the vehicle. The bumper is hingeably mounted to the bottom portion of a vehicle frame (frame rail) by the plurality of mounts. The front bumper includes at least one adjustable end and a hard rubber bottom. Each hydraulic jack of the plurality of jacks is connected to a hydraulic hose. The plurality of jacks and the snow plow assembly are mounted on the plurality of mounts. The plurality of hydraulic jacks are connected to the front bumper. The plurality of hydraulic jacks are connected to the front bumper wherein the three-way valve is configured to a vehicle firewall. The front bumper comprises at least one first curved edge in preferred embodiments and at least one second curved edge.

The front bumper is vertically mounted. The front bumper is vertically mounted in front of the vehicle. The plurality of spray nozzles are forward-facing. The fluid container is mounted behind the front bumper. The plurality of spray nozzles are connected to the fluid container via at least one hose. The plurality of spray nozzles are controllable from inside the vehicle via an operator. As such the snow plow assembly is structured and arranged for mounting to a frame of the vehicle for removal of snow. The hydraulics in particular are mounted to brackets mounted on a bottom portion of a frame rail.

A kit is also disclosed herein including: the snow plow assembly; and a set of installation and use instructions.

The present invention holds significant improvements and serves as a snow plow system. Preferably, a snow plow system should provide convenient ease of use and, yet would operate reliably and be manufactured at a modest expense. Thus, a need exists for a reliable snow plow system, a custom made bumper of a vehicle that works as a snow plow device to avoid the above-mentioned problems.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present disclosure, snow plow systems, constructed and operative according to the teachings of the present disclosure.

The various embodiments of the present invention will hereinafter be described in conjunction with the appended drawings, wherein like designations denote like elements.

DETAILED DESCRIPTION

Figure 1:
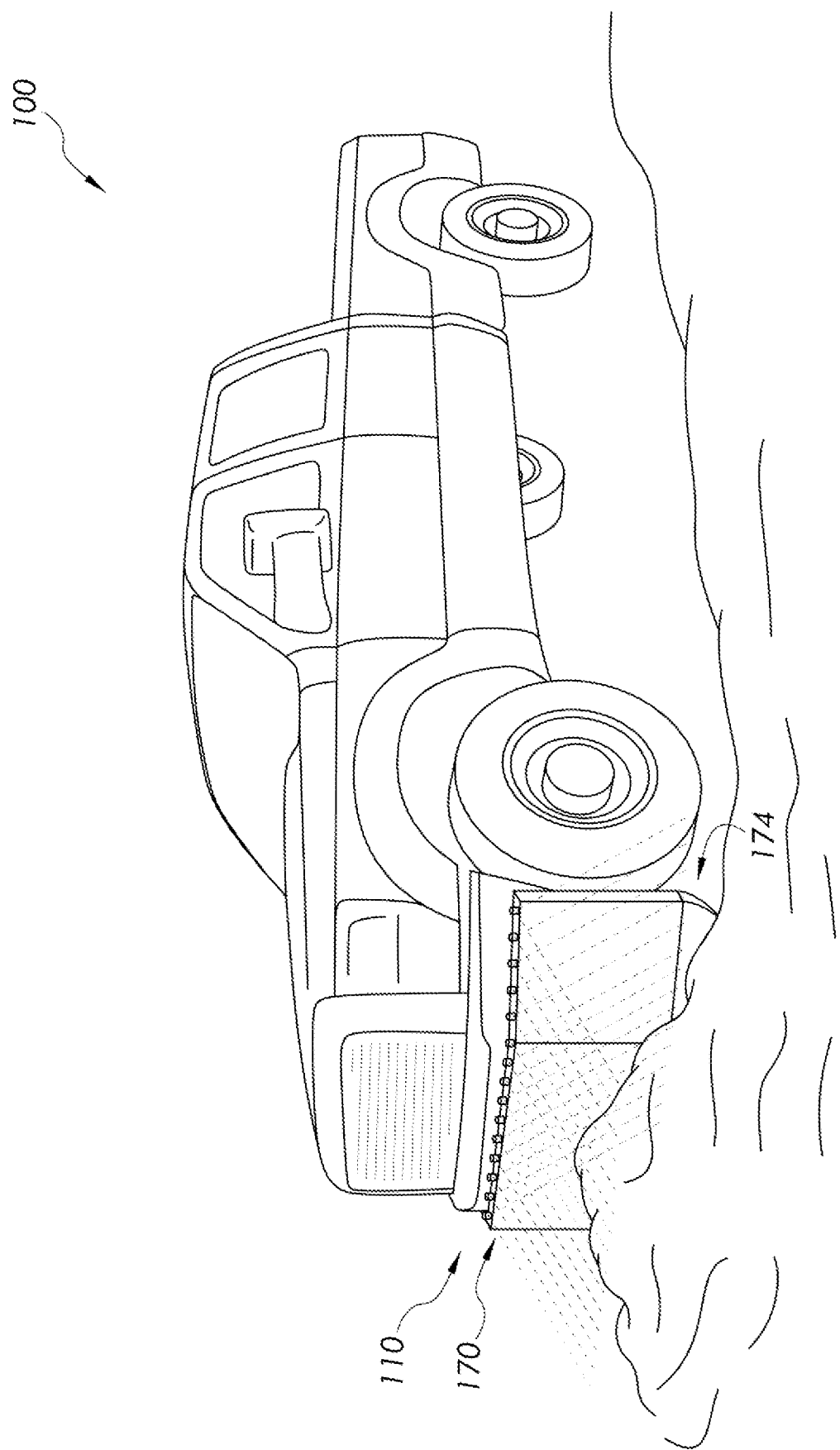
FIG. 1 shows a perspective view illustrating a snow plow system during an 'in-use' condition according to an embodiment of the disclosure.
Figure 2:
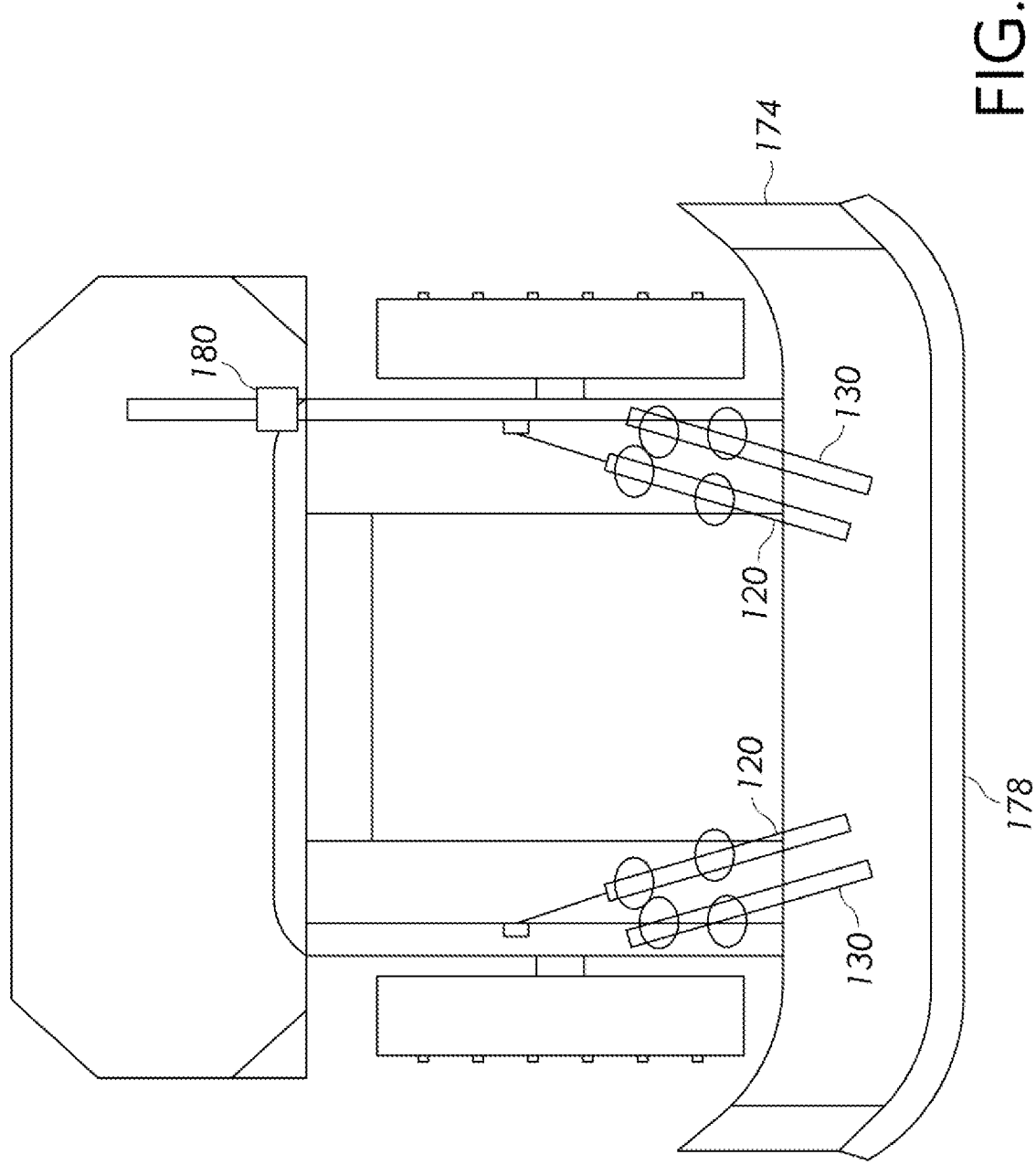
FIG. 2 is a perspective view illustrating the snow plow system comprising a snow plow assembly according to an embodiment of the present invention of the disclosure.

As discussed above, embodiments of the present disclosure relate to a snow plow and more particularly to a snow plow system as used to improve the snow plowing means that is easy and covenant to use.

Generally speaking, the present invention comprises hoses attached to a 3-way valve inside a truck firewall. The figure also shows a pair of wheels or tires attached on both sides of front axle of the truck. The chassis includes a number of cross members and truck frame. The hydraulic assembly installed on the chassis and frame of the truck is also shown in the figure that includes hydraulics or hydraulic jacks, hydraulic hose, a number of mounts, bumper flow attached to a bumper with adjustable ends and a hard rubber bottom. The snow plow system will help users by providing a plow without the hassle of attaching and detaching a snow plow to a vehicle. The device provides means for clearing snow in areas that may not be cleared by traditional snow plows. The snow plow system may be attached to 18 wheelers and pick up trucks to keep highways and roads clear of snow. The snow plow system may be provided as an aftermarket attachment or may be provided directly from an automobile manufacturing company.

As per the preferred embodiment of the present invention, it is a snow plow device for vehicles which includes but limited to small trucks or utility vehicles or cars. It is a custom made bumper which acts as a snow plow device. The bottom of custom made bumper is made of hard rubber and touches down on the road to plow snow. Users can operate it from inside the vehicle. Hydraulics is mounted on the front of the frame and to the back of the custom made bumper. Hydraulics is used here for movement of custom made bumper. In working the bumper extends out and down to the street level, with the help of hydraulic jacks for removing the snow from the road. After removing the desired amount of snow from the road the custom made bumper can re-tract to its own position. The custom made bumper is made up of lightweight materials. It has hydraulics, switches, brackets, springs and hoses. It can work in virtually any environment. The front bumper further includes at least one adjustable end configured to adjust via small hydraulics or other suitable means. The front bumper further includes a hard rubber bottom.

In one exemplary embodiment of present invention the snow plow assembly can be used for removing snow from driveways which terminate at one end at a garage and at the other end at a road.

Referring now more specifically to the drawings by numerals of reference there is shown in FIGS. 1-4, various views of snow plow system 100 for vehicle comprising: snow plow assembly 110 including a plurality of hydraulic jacks 120; a plurality of mounts 130; a plurality of spray nozzles 160; fluid container 190; and three-way valve 180; wherein snow plow assembly 110 comprises in functional combination the plurality of hydraulic jacks 120, the plurality of mounts, the spray nozzles; fluid container 190, and the three-way valve 180.

The plurality of hydraulic jacks are mounted to the plurality of mounts 130 which are controlled via the three-way valve 180. The fluid container 190 is in fluid communication with the plurality of spray nozzles 160, such that the fluid is able to be sprayed on and about the snow plow assembly 110; the snow plow assembly 110 is structured and arranged for mounting to a frame of the vehicle for removal of snow. Snow plow assembly 110 comprises front bumper 170 of the vehicle. The bumper is hingeably mounted to the vehicle frame by the plurality of mounts 130.

The front bumper includes at least one adjustable end 174 and a hard rubber bottom 178. Each hydraulic jack of the plurality of jacks 120 is connected to a hydraulic hose, as shown. The plurality of jacks 120 and the snow plow assembly 110 are mounted on the plurality of mounts 130. The plurality of hydraulic jacks 120 are connected to the front bumper 170. Three-way valve 180 is preferably configured to a vehicle firewall. Front bumper 170 comprises at least one adjustable end 174; and at least one second adjustable end 176. Front bumper 170 comprises a substantially flat planar surface and is vertically mounted.

Figure 3:
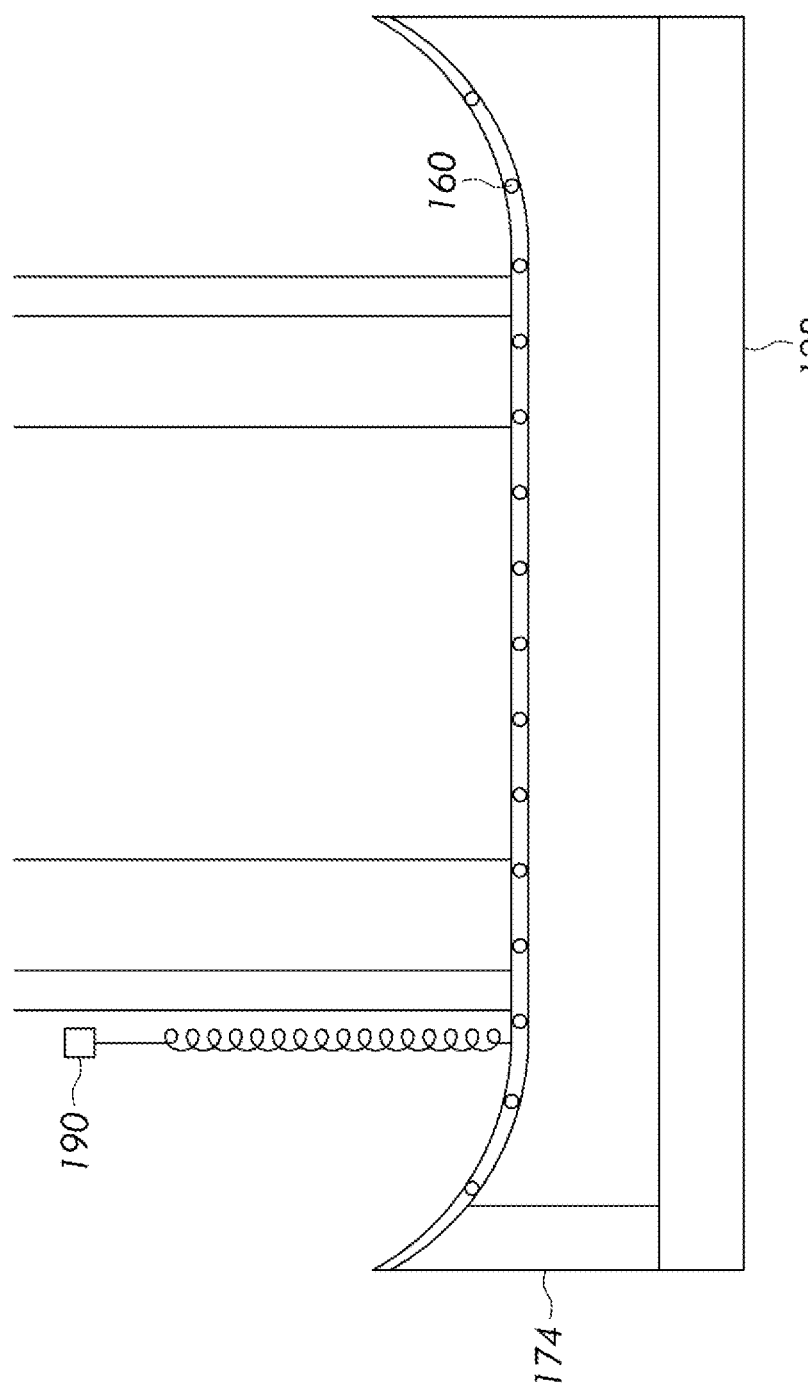
FIG. 3 is a perspective view illustrating the snow plow assembly according to an embodiment of the present disclosure.
Figure 4:
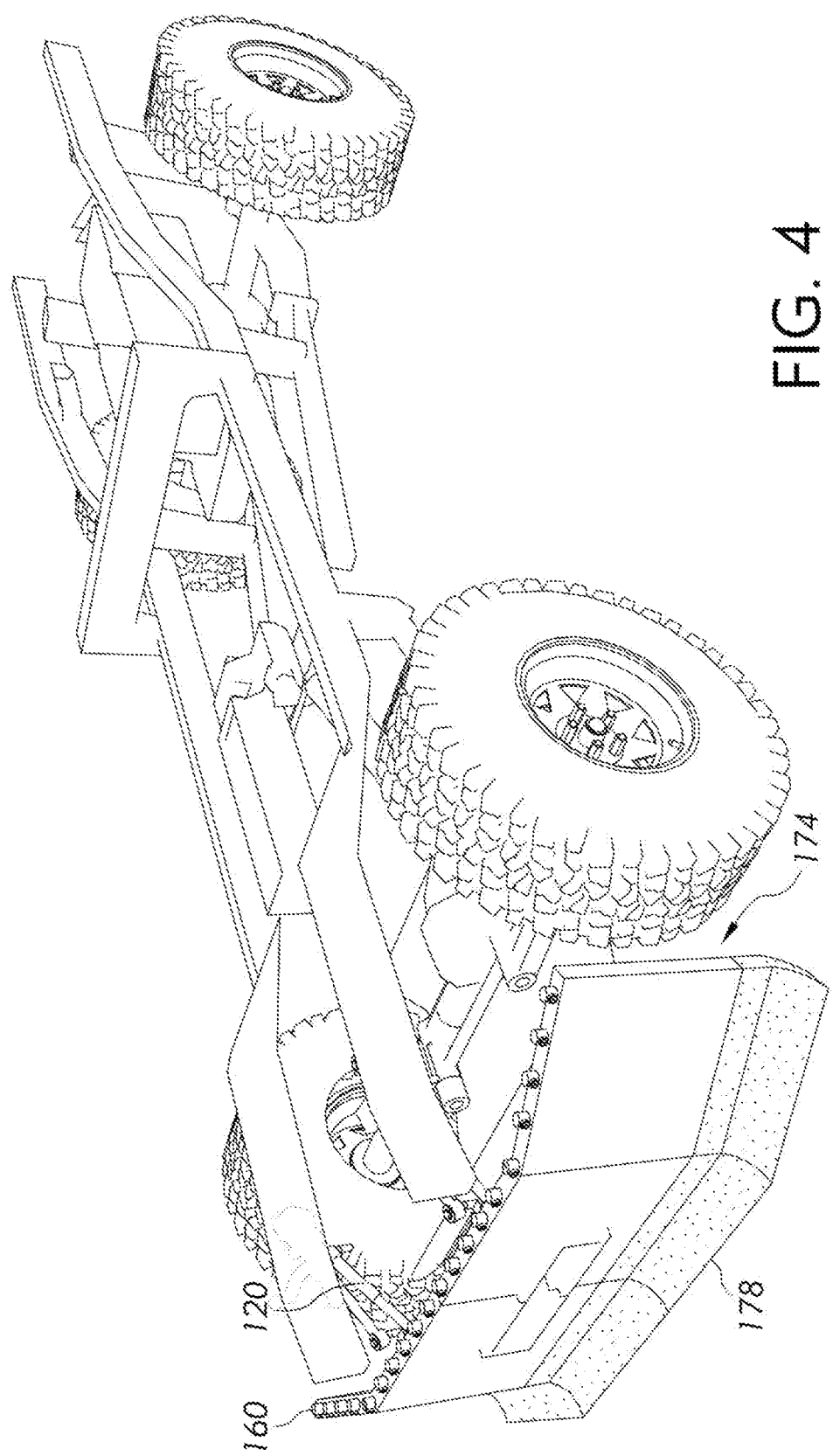
FIG. 4 is a perspective view illustrating the snow plow assembly according to an embodiment of the present disclosure.

As shown in FIG. 3, the front bumper 170 is vertically mounted in front of the vehicle and the plurality of spray nozzles 160 are forward-facing. The plurality of spray nozzles 160 are configured to coat the front bumper 170 so that snow does not stick to the front bumper 170. The plurality of spray nozzles 160 may be operated using a switch within a vehicle to release fluid. The fluid container 190 is preferably mounted behind front bumper 170. The plurality of spray nozzles 160 are connected to fluid container 190 via at least one hose such that the plurality of spray nozzles 160 are controllable from inside the vehicle via an operator.

The snow plow system 100 may be sold as a kit comprising the following parts: at least one hydraulic jack; at least one mount; at least one spray nozzle; at least one front bumper; at least one three-way valve; at least one fluid container; and at least one set of user instructions. The kit has instructions such that functional relationships are detailed in relation to the structure of the invention (such that the invention can be used, maintained, or the like in a preferred manner).

Snow plow system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different mount combinations, parts may be sold separately, etc., may be sufficient.

A method of use for snow plow system 100 may comprise the steps of: step one, lower snow plow assembly 110 to ground via three-way valve on firewall; step two, plow snow; step three, return snow plow assembly 110 to raised position via three-way valve on firewall.

It should be noted that the steps described in the method of use can be carried out in many different orders according to user preference. The use of "step of" should not be interpreted as "step for", in the claims herein and is not intended to invoke the provisions of 35 U.S.C. § 112 (f). Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A snowplow system for attachment to a vehicle, the system comprising:
   a snowplow assembly including a blade with a hard rubber bottom, the blade mounted via a plurality of mounts in place of a vehicle bumper to a bottom of a vehicle frame;
   a plurality of hydraulic hoses;
   a 3-way valve mounted to a firewall of the vehicle;
   hydraulic jacks mounted between the mounts and the blade, the hydraulic jacks being in fluid communication with and controlled by the 3-way valve via the plurality of hydraulic hoses;
   a spray assembly comprising a plurality of forward facing spray nozzles, the nozzles mounted on a top edge of the blade; and,
   a fluid container mounted behind the blade and in fluid communication with the spray nozzles.

2. The snowplow system of claim 1 wherein the blade is hingeably mounted to the hydraulic jacks.

3. The snowplow system of claim 2 wherein the blade further includes a curved edge.

4. The snowplow system of claim 3 wherein the spray system assembly further comprises a spray hose that attaches between the nozzles and the container.

5. The snowplow system of claim 4 further comprising a control device connected to the spray nozzles and disposed inside the vehicle.

* * * * *